United States Patent [19]

Marschner

[11] 4,141,498

[45] Feb. 27, 1979

[54] COMBINATION STRUCTURE AND GREENHOUSE UTILIZING INDIRECT SOLAR ENERGY

[76] Inventor: Walter Marschner, 1292 Main St., Slatington, Pa. 18080

[21] Appl. No.: 846,700

[22] Filed: Oct. 31, 1977

[51] Int. Cl.² .............................................. F24J 3/02
[52] U.S. Cl. ...................................... 237/1 A; 47/17; 126/271
[58] Field of Search .......................... 47/17; 237/1 A; 126/271; 52/173 R, 349, 234

[56] References Cited

U.S. PATENT DOCUMENTS

| | | | |
|---|---|---|---|
| 3,254,703 | 6/1966 | Thomason | 126/271 |
| 3,894,369 | 7/1975 | Schmitt | 52/173 |
| 4,003,365 | 1/1977 | Wiegand | 126/271 |
| 4,004,380 | 1/1977 | Kwake | 52/2 |
| 4,049,195 | 9/1977 | Rugenstein | 237/1 A |

FOREIGN PATENT DOCUMENTS

| | | | |
|---|---|---|---|
| 259001 | 4/1913 | Fed. Rep. of Germany | 237/1 A |
| 557201 | 11/1943 | United Kingdom | 52/173 |

Primary Examiner—Carroll B. Dority, Jr.
Assistant Examiner—Harry B. Tanner

[57] ABSTRACT

A combination multi-story greenhouse and structure in which the sun's rays are utilized to heat water which is thereafter stored to be circulated when needed throughout the structure is disclosed. Indirect heat exchange to maximize use of heat values is also employed. The greenhouse has a first upper roof and side structure designed to best capture the angle of the sun's rays and a second lower roof adapted to receive and transfer heated water. The sun's rays are utilized to enable the growth of plants and in this capacity may be utilized even near the bottom of the greenhouse by use of reflecting means. Heat coincident with the passage of the sun's rays is transferred into water by means of spraying water from nozzles on the underside of the upper roof of the greenhouse and collecting the water on the top of the bottom roof of the greenhouse. Heated water thus collected is circulated into the basement through a heat sink and into a water storage area.

Rain water is collected from the roof of the non-greenhouse structure and is conveniently utilized as the water supply for the system. Overflow means are provided to dispose of excess rain water which might collect on the roof. Though the greenhouse is only one story tall, the exterior building structure is multi-floored and, at the juncture of the floors with the wall of the greenhouse, radiators are disposed around the perimeter of the greenhouse to allow heat previously collected and stored as heated water to be used in heating the structures.

10 Claims, 4 Drawing Figures

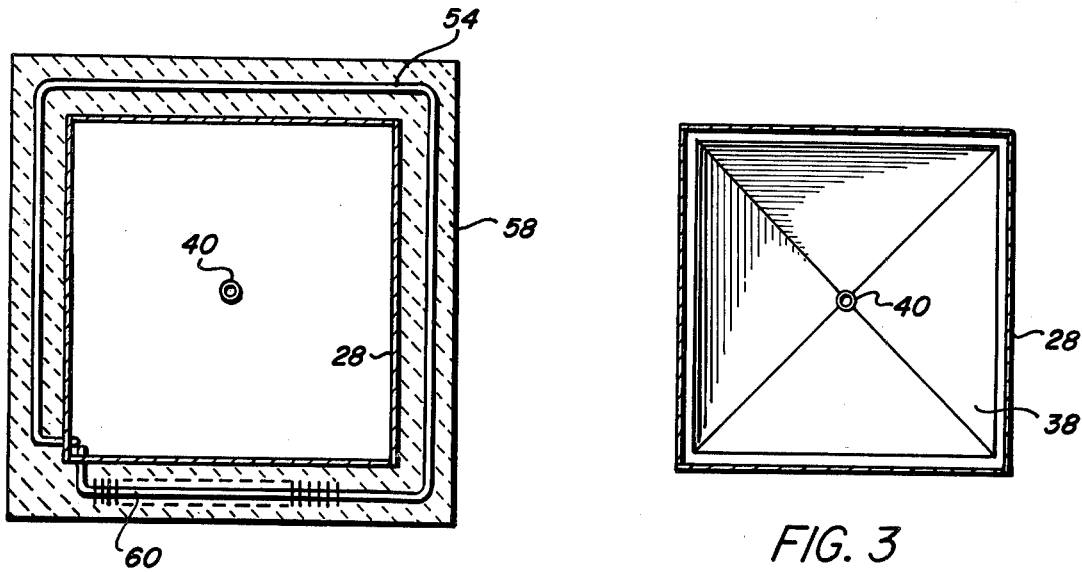
FIG. 4
FIG. 3
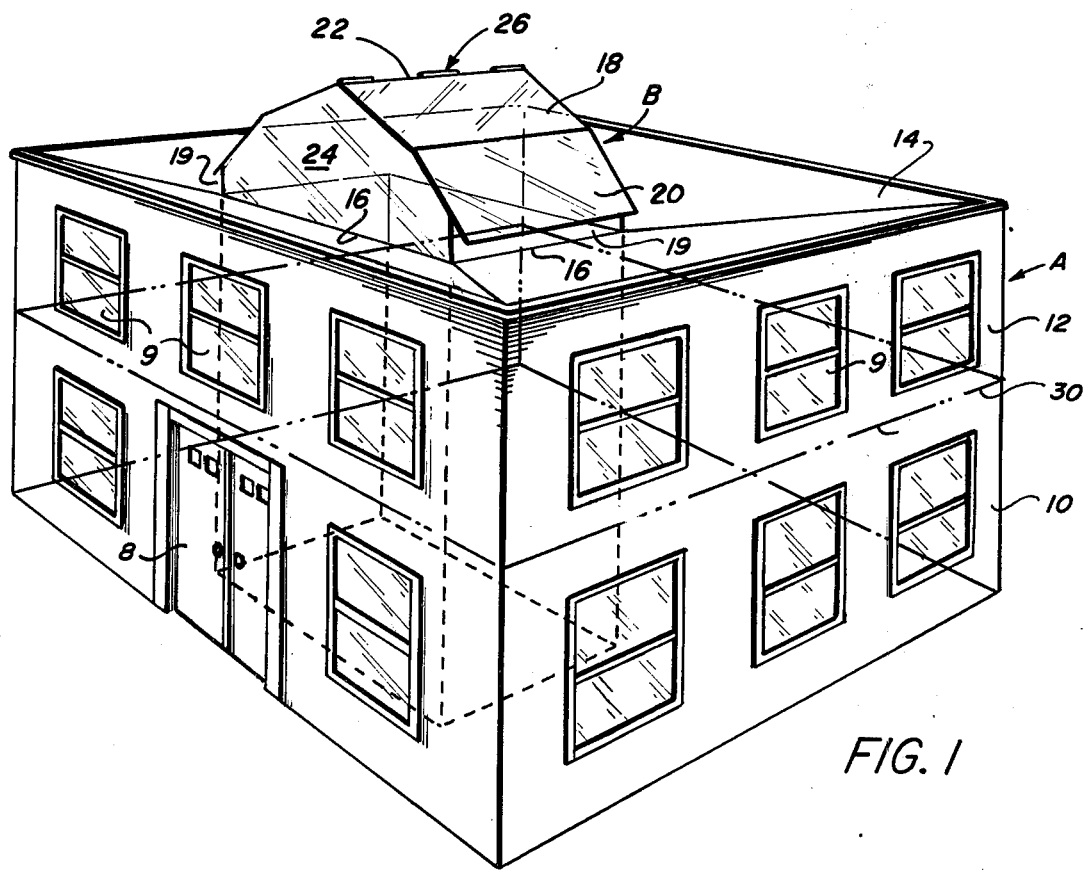
FIG. 1

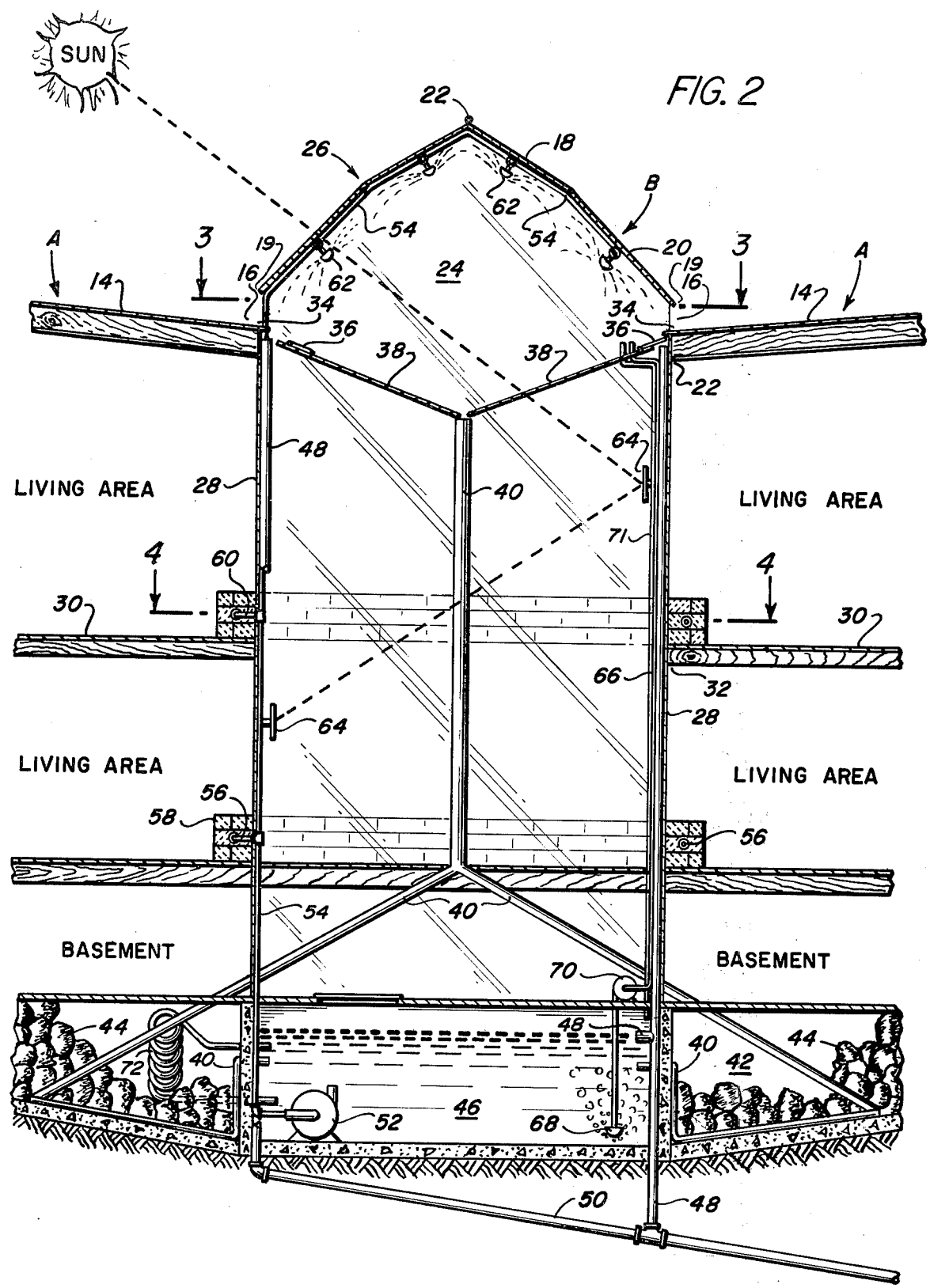

COMBINATION STRUCTURE AND GREENHOUSE UTILIZING INDIRECT SOLAR ENERGY

BACKGROUND OF THE INVENTION

1. Field of the Invention

This invention relates to combination building structures and more particularly to such structures in combination with indirect solar heat means.

2. Description of the Prior Art

The idea of having a greenhouse as part of one's home or other structure is, of course, old. U.S. Pat. No. 1,526,766 to Arnold and U.S. Pat. No. 3,894,369 to Schmitt et al are examples of combination greenhouses and homes. People enjoy the aesthetic benefits of having greenery within their homes and the pleasing benefits of lightness that greenhouses bring. It is also generally recognized that during periods of full and intense sun, a great deal of heat is generated within the air within the greenhouse. Also generally recognized is that in periods of cold weather, auxiliary heating for the greenhouse to provide life-sustaining support for the plants is likewise necessary. Furthermore, a reference such as Schmitt et al recognizes direct benefits which may be obtained from allowing the direct heating of a structure by the passage of the sun's rays directly through the glass walls into the structure. While direct solar heat is certainly simple in design, it has certain inherent deficiencies. There is no heat storage, for example, and this lack of heat storage means that in the summer a home becomes too hot unless it is shaded while in the winter excess heat, from the living structure itself, is dissipated through the glass walls into the greenhouse and lost. Secondly, any kind of truly useful greenhouse and building structure combinations have been, because of the nature of direct solar energy, limited to one story structures. Two story structures have had to be confined to such structures as the greenhouse on top of the house as is shown in Arnold.

Furthermore, solar heating systems have heretofore generally required the use of solar panels as a source of heat gathering. See for example U.S. Pat. No. 2,559,870 to Gay and U.S. Pat. No. 2,780,415 also to Gay. Solar panels have proven to be so expensive as a capital outlay as to negate their usefulness.

Each of these foregoing references reflect both a primitive solution and also a solution directed to but a single segment of what is an overall heat transfer problem.

In these days of the energy crunch there is a great need to conserve fossil fuel in the national interest, as well as an economic need for saving money in heating for the individual home or office. These needs are best satisfied where the use of fossil fuel for heating is curtailed as today with unexpected suddenness, energy is both costly and supply, especially of oil and gas, is uncertain.

There is therefore a need to have a truly efficient means of heating a home or office such as is possible with solar heat. Unfortunately, solar heat heretofore has most often resulted in ugly design dependent on expensive and ugly solar panels.

The elimination of the need for solar panels would both lessen cost and create a more pleasing structure design.

Furthermore, greenhouses which are both pleasing to the eye and provide a potential source for growing food have heretofore been an economic burden on their owners by virtue of the need to provide for their cooling during the heat of the day (even in winter) and their heating at night during cold weather.

No solution has been heretofore known which would solve the dual problem of solar heat inherent in the use of solar panels or provide a truly efficient way to realize the benefits of a greenhouse while providing for its economical maintenance.

SUMMARY OF THE INVENTION

The aforesaid disadvantages of the prior art are obviated by the structure and method of this invention.

Briefly stated, this invention contemplates a combination structure of home or office together with a greenhouse while utilizing solar energy for the heat source.

In this invention, the sun's rays are utilized to first heat water by spraying the sun-heated air within an upper chamber of a greenhouse with water. The heat from the air is transferred to the water in accordance with the principles of latent heat of vaporization of water. The water thus heated is circulated through a heat sink into which heat values may be transferred to be later used when needed on cool days to heat the structure and/or greenhouse.

Furthermore, the structure of this invention contemplates a multi-story home wherein a single story greenhouse portion of the home is contained generally in the center of the home and the home surrounds the greenhouse on every floor. Thus when one stands in a first floor room such as a living room or a dining room one may see directly through the glass wall into the greenhouse area and perhaps have doors in all rooms opening thereupon. At the second floor level the greenhouse serves as a focal point of incredible beauty that one may observe by standing and looking through the glass wall of the greenhouse downwardly into the full length of the greenhouse. A baseboard-type arrangement, of brick or some other suitable construction material is utilized to contain a radiator assembly which circumscribes the greenhouse at its perimeter at floor level on both floors. Thus, this low barrier serves the dual purpose of providing safety against accidentally kicking in the greenhouse wall and in its second capacity serves as the repository for radiating fins through which heated water from a closed system is utilized.

The heat system operates as follows. Water circulates from the water storage tank through the heat sink picking up heat values as needed to maintain tank temperature. Heat is then delivered to the rooms via the radiators in a closed loop system which operates by conventional thermostat.

A distinct feature of this invention relates to a dual roof for the greenhouse. Both roofs, as well as the sides of the greenhouse, are made of heat and light admitting material, preferably glass. The purpose of the second inner concave roof of the greenhouse is to serve as a collection point for the water after it has been discharged from the spray nozzle heads and has passed through the heated air present in this inner upper chamber of the greenhouse. The water derives heat values both from passing through the heated air and also from this glass or glasslike concave roof.

The concave roof also serves as a collection point for the preferred embodiment of this invention in which rain water is utilized as the main source of water for the closed loop heating system. In the preferred embodiment the rain water passes from the roof of the house structure itself through the valve openings into the concave roof and from there down a center pipe. When the tank is filled with water, the valves may be conveniently and automatically closed and rain water collecting on the roof will thereafter be discharged into overflow piping and into a sewage or gutter system where it is carried away.

Vents are provided in the convex uppermost greenhouse roof to allow for a direct transfer and circulation of atmospheric air both within the upper and lower greenhouse chamber.

As an added optional feature of this invention, direct pumping of hot air to the water tank in the storage area to directly heat the water may be utilized. In this embodiment, equalizing air pressure means are utilized.

The primary object of this invention is to provide a heat-saving, low cost means of combining the healthful and aesthetically pleasing effects of a greenhouse with a solar heat value to be derived therefrom.

It is a further object of this invention to achieve the aforementioned benefits in a structure of both architectual simplicity and beauty.

It is still another object of this invention to provide a method of combining benefits of indirect solar heating through the use of a heat sink with a direct solar benefits of heat and light penetration within the home living area.

It is another object of this invention to provide a solar heat system which eliminates the necessity of using ugly and expensive solar panels heretofore required by the prior art.

It is yet another object of this invention to provide a combination greenhouse and dwelling or office structure which combines all of the aforesaid benefits within a multi-story dwelling.

These and other objects will be more readily apparent to those skilled in the art from a consideration of the following Figures, description and exemplary embodiments.

BRIEF DESCRIPTION OF DRAWINGS

FIG. 1 is a perspective illustrating the preferred embodiment of this invention.

FIG. 2 is a transverse cross section showing the greenhouse portion of the structure of the preferred embodiment of this invention.

FIG. 3 is a top plan view taken on line 3—3 of FIG. 2.

FIG. 4 is a top plan view taken on lines 4—4 of FIG. 2.

DETAILED DESCRIPTION OF THE PREFERRED EMBODIMENT

Referring now to the drawings, and in particular to FIG. 1, A represents a conventional structure designed as home or office and which in FIG. 1 is shown with conventional door 8 and windows 9. Structure A includes first floor 10 and second floor 12. Structure A completely surrounds second interior single floor structure B. Roof 14 of structure A is shown sloping toward the center of structure A to the point at which it joins structure B at roof juncture 16. The sloping roof allows rain water to collect as will be explained in more detail hereinafter.

Structure B, shown partially in phantom, is a greenhouse structure. By the term greenhouse is meant a structure substantially constructed of heat and light admitting materials. Structure B is shown with generally horizontal roof panel 18, 20 and generally vertical roof panel 19. Roof panel 18 is hinged at its upper edge 22 to allow roof panel 18 to be vented, if desired, to the atmospheric air. Roof panels 18 and 20 are shown in connection with side panel 24 and each panel 18, 19, 20 and 24 are one of a pair, the total of which define among them generally convex upper roof 26 of structure B. Within structure A, side wall 28 of structure B, together with second floor perimeter 30, and second floor vertical edge 32 are all shown in phantom in FIG. 1.

Roof panel 18 is hinged at its upper edge to allow for air circulation.

Referring now to FIG. 2, the multi-story combined building structure of FIG. 1 is shown in cross section. In FIG. 2, exterior building unit structure A, is shown in partial fragmentary view with home or office areas designated as living areas.

The system employs water as a heat transfer medium. Initially to fill or refill the water tank, rain water, collected on roof 14 of structure A will travel downwardly due to gravity along roof 14 toward building structure B. Roof opening 34 is provided at the juncture of vertical roof panel 20 with roof 14. Water received through roof opening 34 passes through valve means 36 onto lower greenhouse roof 38 and into water receiving pipe 40. Water receiving pipe 40 is located proximate the center of interior structure unit B. Water receiving pipe 40 travels the length of structure B and through the floor. After water receiving pipe 40 passes through the floor of structure B, the pipe diverges into two sections each of which proceed through heat sink 42 where heat values stored in the water may be transferred to heat conducting elements 44. Heat conducting elements 44 are preferably rock. Water receiving pipe 40 after passing through heat sink 42 discharges into water storage tank 46. When water storage tank 46 is filled to capacity, valve means 36 may be operatively engaged to communicate with overflow pipe 48 as shown in FIG. 2 in broken view. Overflow pipe 48 is connected with sewage line 50 which transports the excess and unwanted water out of the system and into appropriate sewage lines or gutter, not shown.

Heat values are provided to heat conducting elements 44 during hot days by spraying tap water from nozzles 62. The water collects on lower greenhouse roof 38, passes into water receiving pipe 40 where it circulates over and among heat conducting elements 44 in heat sink 42. The heat is thus indirectly transferred to the elements, and the water, now in cooled condition flows into water storage tank 46.

Water in water storage tank 46 is kept at a pre-determined hot temperature by flowing through circulating pipes 72 in heat sink 42 in a closed indirect heat transfer loop. The loop is operated by conventional thermostat means.

On cool days when heat values are needed in structures A and/or structure B, water is pumped from water tank 46 via water conducting pipe 54 preferably to the second floor radiating means 60 where it circulates around the second floor perimeter 30. The water then continues in pipe 54, dropping by gravity to first floor radiating means 56 in radiator enclosure 58 where it circulates around the structure perimeter at that level and finally discharges back into water storage tank 46.

By means of the foregoing system, heated air is cooled and heat values are transferred into water. The heated water is stored until needed, and thereafter the heat values are retransferred into the air to provide heat necessary for the enjoyable habitation of the living areas.

Necessary cooling for the greenhouse structure may be provided, in the case of upper greenhouse portion by opening the roof panels. The lower greenhouse area may be cooled by vents either leading into the upper greenhouse structure which operate in conjunction with valve means 36 or in the alternative, for example, by venting through the attic where such is provided.

A third alternative for venting the greenhouse may be through vents which would be provided in either vertical panel 19 or side panel 24. This embodiment would allow separate ventilation for the upper or lower chamber to allow different temperatures to be maintained in each chamber. Thermostatic controlled automatic means may be utilized to control the vent opening and closings.

As an additional aid to the enjoyment of the greenhouse structure, reflecting means 64 which may be large mirrors are strategically placed within the greenhouse at angles predetermined to capture and transmit the sun's rays downwardly through the greenhouse structure to enable the growing of plants throughout its length and particularly on the floor of the greenhouse.

As an auxiliary aid to the heat transfer process, water in water storage tank 46 may be heated directly by pumping heated air from the upper greenhouse structure directly through water tank 46 by means of tube 66, through bubbler 68 by means of air pump 70. Pressure equalization may be restored by vent pipe 71.

FIG. 3 is a cross section taken on lines 3—3 of FIG. 2. FIG. 3 illustrates the concave nature of the lower greenhouse roof panels 38 and their joinder with water receiving pipe 40.

FIG. 4 is a cross section of structure B taken on lines 4—4 of FIG. 2. In FIG. 4 second floor radiating means 56 within radiator enclosure 60 are shown totally on the outside of interior structure B. In this illustration the heat to be derived from the water as it flows through radiating means 60 is intended solely for use within structure A and no provision is made, in this illustration, to utilize some of the heat to also heat structure B.

There are many variations which may be practiced within the scope of this invention.

For example, interior structure B, while preferably made of glass, may be made of any heat and light admitting material suitable for the purpose. For example, certain plastics, such as those commonly known as plexiglass may be substituted.

In reference to the heat sink, while rock is disclosed as a preferred embodiment, any material such as sand or others well known in the art may be substituted. Furthermore heat sink 42 may be constructed such that the heated water travels throughout the heat sink in pipes in a serpentine or other configuration whereby the heat values are transferred to the elements indirectly. Alternately, if the heat sink is suitably constructed, water receiving pipe 40 may simply terminate so that the water spills directly from pipe 40 over the rock and proceeds into water storage tank 46 by overflow means. In this way the heat values will be directly transferred from the water to the heat elements.

In regard to the radiating means, while FIG. 2 illustrates an embodiment in which ground radiating means 56 and radiator enclosure 58 are positioned totally within structure A, an alternate embodiment contemplates allowing part of radiating means 56 and 60 to be disposed also within structure B to provide heat values for the greenhouse during cold weather.

There are many variations which may be practiced within the scope of this invention.

While the Figures illustrate a home and greenhouse combination, the combination of this invention is equally suitable for office and greenhouse, store and greenhouse, or any other habitable structure.

The greenhouse structure is preferably made of glass but any other suitable heat and light admitting materials such as plexiglass or other suitable plastic, synthetic or natural material may be substituted.

FIG. 1 illustrates a two story home, but three, four or other combinations such as split level are also within the scope of this invention.

While rain water has been illustrated as particularly suitable as the source of water necessary as the heat conducting medium in this invention, it is equally within the scope of this invention to utilize tap water for this purpose.

Another variation contemplated within the scope of this invention relates to the general shape of the exterior living structure. The preferred embodiment illustrates a generally rectangular structure, but any shape structure such as hexagon or circular or combinations are within the scope of this invention so long as the exterior structure totally surrounds the interior greenhouse structure.

The heat sink illustrated and described in this invention is a conventional one. The rock disclosed as a suitable material for the heat conducting elements is meant to be illustrative only and any one of a great number of such elements disclosed and known by the prior art may be substituted for the rock disclosed in this invention.

There are many advantages to the combination structure and greenhouse of my invention.

My combination structure provides a truly efficient means of heating a home or office which combines the efficiency of solar heat with the beauty and utility of a greenhouse.

Furthermore, although my invention is directed to a system utilizing solar heat, no solar panels are required to achieve this effect.

Therefore, the structure of this invention, enables the serious problem of providing heat to be solved in a manner which is both efficient and pleasing to the eye.

Having now described and illustrated my invention it is not intended that such description limit this invention, but rather that this invention be limited only by reasonable interpretation of the apended claims.

What is claimed is:

1. A multi-story combined building structure comprising:
   (a) a first exterior building unit including exterior walls, roof and at least two floors adapted for human habitation, and
   (b) a second interior single floor building unit including above a ground floor, walls and top constructed substantially of heat and light admitting material, said walls defining interior walls of said first building unit, and said top comprising
      (i) a first lower roof whose dimensions are generally concave toward its center and
      (ii) a second upper roof, said second upper roof including generally vertical sides and a multiplanar generally convex top which extends in height above said roof of said first unit, said roofs defining the top and bottom of an upper greenhouse chamber;

(c) a water storage tank;

(d) a heat sink including heat conducting elements disposed beneath the ground contiguous with the building structure;

(e) a continuous water conducting pipe extending vertically along the walls of said second interior building unit and horizontally around said interior building unit at each story of said multi-story structure;

(f) heat radiating means interspersing said horizontally disposed water conducting pipe and connected thereto by valve by-pass means, said water conducting pipe being connected in a closed loop circuit to said water storage tank;

(g) a pump adapted to communicate with water in said water storage tank whereby water in said tank may be pumped upwardly through said water conducting pipe;

(h) water spraying means, disposed near the top of said second interior building unit;

(i) water receiving pipe means disposed through said interior building unit, one end of which is adapted to receive water from the concave lower roof top, and the other end of which is disposed within said heat sink and connected to said water tank;

(j) valve means situate with respect to said exterior roof top and said water receiving pipe means to allow a measured amount of rain water to be received from said exterior roof through said valve means into said interior concave roof, said received water flowing by gravity into said receiving pipe means downwardly through said heat sink and into said water storage tank;

(k) water circulating means operatively connected between said water storage tank and said heat sink whereby heat value from said sink may be transferred to said water;

(l) an overflow receiving pipe means operatively connected with said exterior roof at its one end and connected to sewage disposal means at its other end whereby excess rain water may be conducted away from said inner concave roof top; and, (m) overflow means operatively connected to said water storage tank to receive excess water accumulating therein.

2. A building structure according to claim 1 in which the light and heat admitting material is glass.

3. A building structure according to claim 1 which contains additionally: reflectors disposed along the inner walls of the interior building unit at pre-determined positions so that light received from the sun which touches said reflectors is diverted downwardly within the building structure.

4. The building structure according to claim 1 in which the heat conducting elements of the heat sink of step (d) are rock.

5. The building structure according to claim 4 in which the water-receiving pipe means and the heat sink are adapted so that water is allowed to flow directly over the rock and enters the water tank by overflow means.

6. The building structure according to claim 4 in which the water-receiving pipe means where disposed within said heat sink operates by indirect heat transfer from said water-receiving pipe to said heat sink heat conducting elements.

7. The building structure of claim 1 including additionally: air pumping means disposed within said upper chamber and connected to said water tank water to enable water tank water to be heated by the direct passage therein of heated air from said upper chamber and pressure equalizing means associate with said air pumping means to equalize air pressure differences attributable to said pumping.

8. The building structure according to claim 1 including additionally: venting means located on said second upper roof whereby said second upper roof may be opened to allow a direct passage and circulation of atmospheric air within said upper chamber.

9. The building structure according to claim 1 in which said heat-radiating means are operatively disposed to allow heating of both said exterior building unit and said interior building unit.

10. A method of utilizing indirect solar heat to heat air in at least part of a multi-story combination greenhouse and structure in which the greenhouse includes an upper and lower chamber and in which the greenhouse is situate within the confines of the multi-story structure and its height including the upper chamber exceeds the height of the non-greenhouse structure comprising:

(a) passing the sun's rays through the upper greenhouse chamber into the lower greenhouse chamber, (b) reflecting said light downwardly through said greenhouse lower chamber to transfer plant growing sun rays throughout said greenhouse area and through the lower chamber walls into the building structure, (c) simultaneously with said passage of said sun's rays, spraying the air within the upper chamber to transfer heat energy into the water from the air, (d) collecting said heated water and transferring same to a heat sink where said heat may be transferred and stored, (e) circulating, during periods of air coolness, said heated water to radiators disposed around the perimeter of said greenhouse to transfer heat from said water to said air.

* * * * *